United States Patent [19]

Cailloux

[11] 3,918,339

[45] Nov. 11, 1975

[54] ROCKING ACTION SHEARING APPARATUS WITH A PIVOT AXIS FOR THE MOVABLE BLADE INCLINED TO THE CUTTING EDGE OF THE STATIONARY BLADE

[75] Inventor: Paul Cailloux, Le Perreux, France

[73] Assignee: Promecam-Sisson-Lehmann, Saint-Denis, France

[22] Filed: Feb. 5, 1975

[21] Appl. No.: 547,449

[30] Foreign Application Priority Data
Feb. 8, 1974 France .............................. 74.04255

[52] U.S. Cl...................................... 83/611; 83/597
[51] Int. Cl.²........................................ B26D 5/00
[58] Field of Search...................... 83/597, 610, 611

[56] References Cited
UNITED STATES PATENTS
1,952,961 3/1934 Yates ................................... 83/611
2,836,241 5/1958 Fritzinger ............................. 83/611

*Primary Examiner*—J. M. Meister
*Assistant Examiner*—W. D. Bray
*Attorney, Agent, or Firm*—Michael S. Striker

[57] ABSTRACT

A shearing apparatus which includes a stationary rectilinear blade fixedly mounted on a stationary support and a movable rectilinear blade having a cutting edge including a predetermined angle with the cutting edge of the stationary blade. The movable blade is mounted for rocking movement about a pivot axis located in a plane which bisects the predetermined angle and which is substantially normal to a plane which includes the cutting edges of the two blades.

5 Claims, 4 Drawing Figures

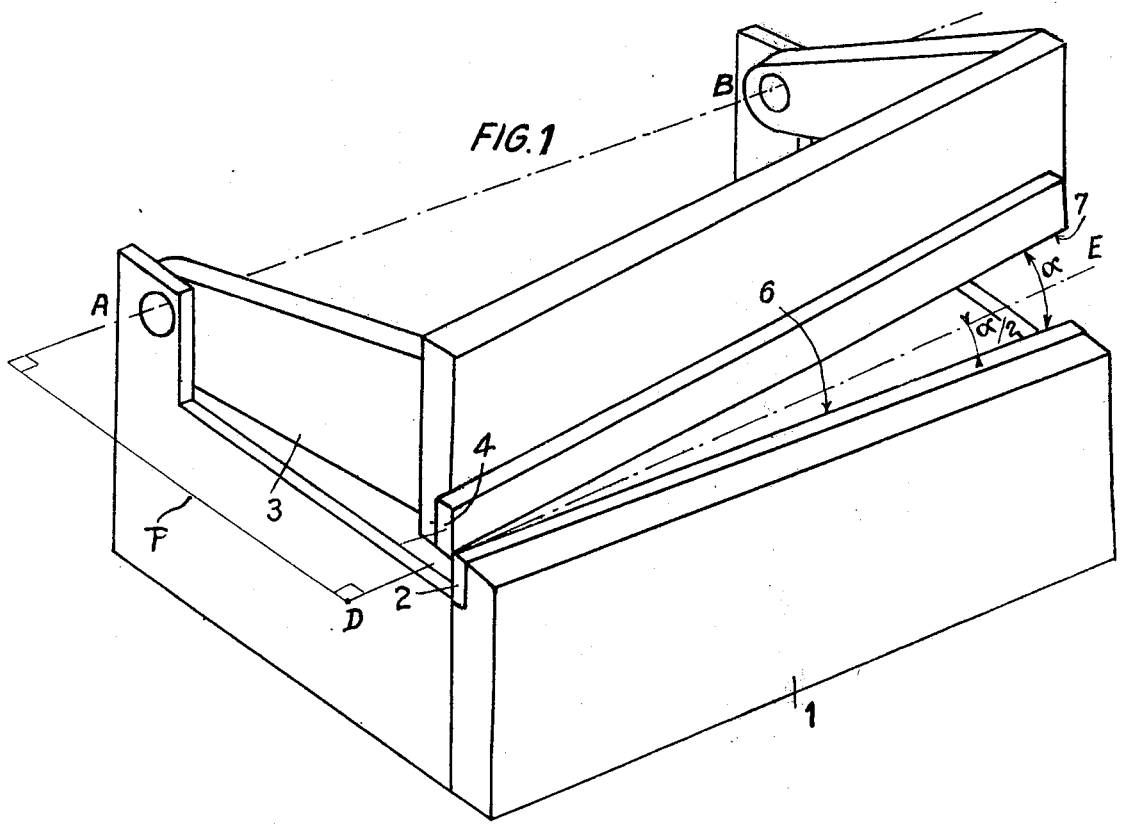
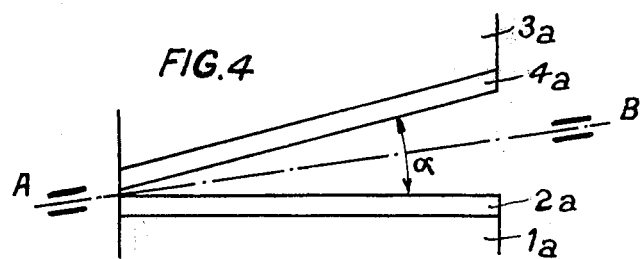

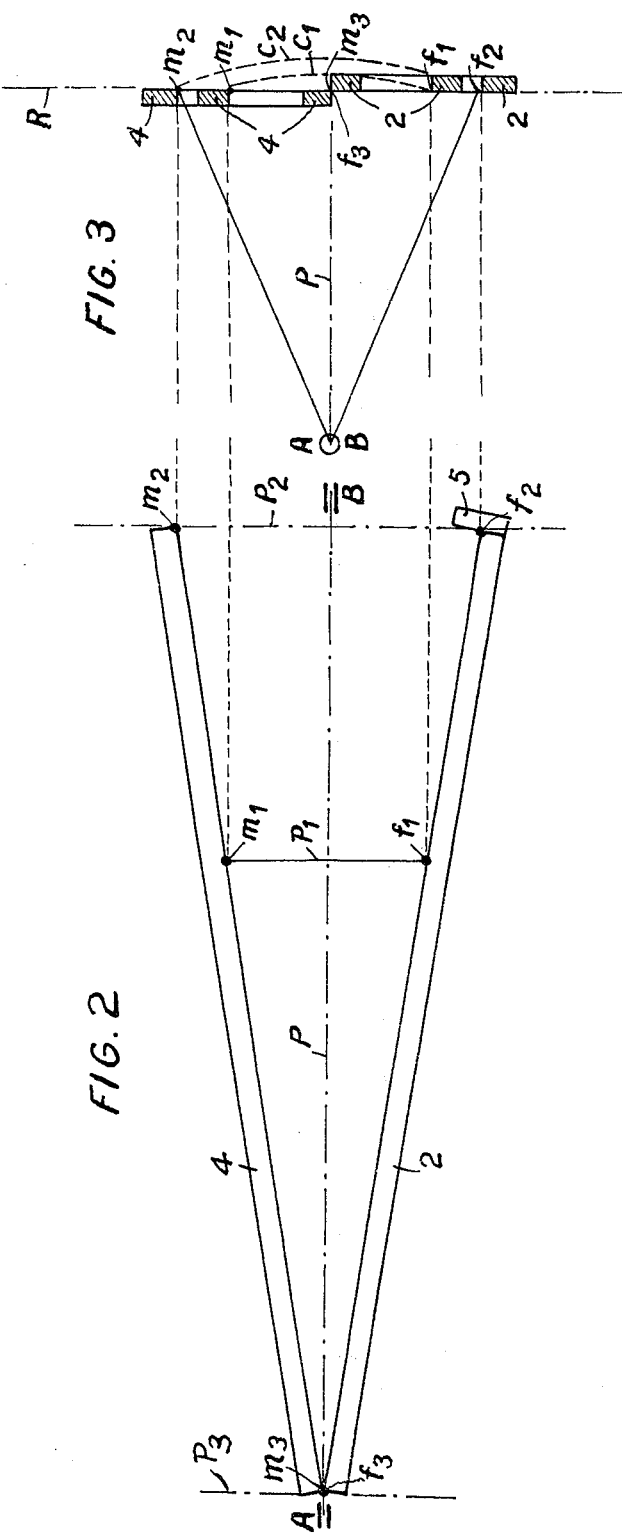

ROCKING ACTION SHEARING APPARATUS WITH A PIVOT AXIS FOR THE MOVABLE BLADE INCLINED TO THE CUTTING EDGE OF THE STATIONARY BLADE

BACKGROUND OF THE INVENTION

The present invention relates to rocking action shearing apparatus designed for cutting metal plates, sheet metal or the like.

Shears of this general type usually comprise a fixed frame structure supporting a rectilinear stationary blade while a movable blade, the cutting edge of which includes a predetermined angle with that of the stationary blade, is mounted on a member arranged for rocking motion about a pivot axis transversely spaced from the cutting edge of the movable blade. Due to the pivotal movement of the member and the movable blade carried thereby, the cutting edge of the movable blade should theoretically have a substantially helical shape so that successive points on the movable blade crossing corresponding points of the stationary blade will cross each other with the same clearance. However, it is extremely difficult to mount the movable blade on the pivotable member so that the cutting edge of the movable blade will have a substantially helical shape, as this requires a complicated machining on the support of the movable blade.

For this reason, various manufacturers of such shearing apparatus machine the support for the movable blade with a rectilinear support surface and obtain a helical configuration of the cutting edge for the movable blade by shims or similar adjustments. This will result in a make-shift construction which in addition requires difficult adjustment steps.

SUMMARY OF THE INVENTION

It is an object of the present invention to provide for a shearing apparatus of the aforementioned kind which can be manufactured in a simpler manner than the above-described shearing apparatus known in the art in which the cutting edge of the movable blade can be maintained rectilinearly while assuring a constant clearance between successive points of the cutting edge of the movable blade and corresponding points of the stationary rectilinear blade during operation of the apparatus.

With these and other objects in view, which will become apparent as the description proceeds, the shearing apparatus according to the present invention for shearing metal plates of the like mainly comprises stationary support means, a stationary blade having a rectilinear cutting edge and being fixedly mounted on said support means, a movable blade having a rectilinear cutting edge located substantially in one plane with the rectilinear cutting edge of the fixed blade and being in this plane inclined at a predetermined angle with regard to the cutting edge of the stationary blade, and means mounting the movable blade for rocking movement about a pivot axis transversely spaced from the cutting edge of said movable blade and located in a plane bisecting said predetermined angle and substantially normal to the plane including the cutting edge of the two blades.

With this arrangement, the stationary and the movable blade are disposed symmetrically to the pivot axis of the means mounting the movable blade for rocking movement. Therefore, the cutting edges of both blades may be rectilinear while a zero or constant predetermined clearance may be obtained between the cutting edges of the two blades, throughout their length, during their relative crossing movement.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a diagrammatic perspective view of the shearing apparatus according to the present invention;

FIG. 2 is a diagrammatic front view of the apparatus shown in FIG. 1;

FIG. 3 is a diagrammatic side elevational view illustrating successive relative positions of the blades during the crossing thereof;

FIg. 4 is a view similar to FIG. 2, showing a modified embodiment.

DESCRIPTION OF THE PREFERRED EMBODIMENTS

Referring now to the drawing and more specifically to FIGS. 1-3 thereof, it will be seen that the rocking action shearing apparatus according to the present invention comprises a fixed or stationary blade 2 having a rectilinear cutting edge and being supported in stationary position on stationary support means 1. The apparatus includes further a movable blade 4 having likewise a rectilinear cutting edge located substantially in one plane with the cutting edge of the stationary blade 2 and including in this plane with the cutting edge of the stationary blade 2 an angle $\alpha$. The movable blade is mounted on a substantially U-shaped member 3 which is pivotable about an axis A–B, as schematically shown in FIG. 1.

According to the present invention, the pivot axis A–B is located in a plane P containing the bissectrix DE of the angle $\alpha$ formed by the two blades 2 and 4, said plane being substantially normal to the plane R containing the cutting or sharp edges 6 and 7 of said blades respectively (see FIG. 1 and 3).

The embodiment illustrated in FIGS. 1–3, the plane P is a horizontal plane and the stationary blade 2 is downwardly inclined from one to the other end with respect to the plane P, while the movable blade 4 is upwardly inclined from the corresponding end to the other end thereof with respect to the plane P, as clearly shown in FIG. 2.

With this construction it is not necessary to give the cutting edge of the movable blade 4 a helical configuratiion, but the cutting edge of the blade 4 may be rectilinear, as is the cutting edge of the fixed blade 2, while nevertheless assuring a substantially zero or predetermined constant clearance at the crossing points of the blades throughout the length thereof.

This is evidenced by the diagrams of FIGS. 2 and 3. Thus, the diagram of FIG. 3 illustrates arbitrarily in a single Figure the various cross-sectional views of the two blades 2 and 4 which are taken along separate planes P1, P2 and P3 normal to the plane R containing the sharp cutting edges 6 and 7 of these two blades. If we examine what takes place in each one of these planes, we see that the corresponding points $m_1$ and $m_2$ of the sharp edge of the upper, movable blade 4 move along circular arcs $C_1$ and $C_2$ respectively so as to cross the fixed blade 2 at $f_1$ and $f_2$, respectively. Now this is true for all points of both blades and therefore a zero or constant clearance is obtained throughout the blade length.

When the stationary blade 2 is inclined downwardly, as in the illustrated example shown in FIGS. 1–3, another advantage is derived if a guide bar 5 is provided at the lower end of the stationary blade 2, as shown in FIGS. 2 and 3, since the sheet-metal plate to be cut will automatically be aligned along one edge thereof by gravity with the guide bar 5. This will simplify placing the metal plate for the cutting operation if the cut should be carried out normal to a side edge of the plate.

However, it is not necessary to mount the stationary blade 2 in downwardly inclined position. Evidently, it is also possible to dispose the cutting edge of the stationary blade in a horizontal plane, as shown in the modified embodiment of FIG. 4.

However, as in the embodiment described in connection with FIGS. 1–3, the pivot axis A–B for the mounting means $3a$ supporting the movable blade $4a$ is likewise located in a plane P bisecting the angle $\alpha$ which the cutting edges of the two blades include, and this plane P is perpendicular to the plane containing the cutting edges of the two blades. The plane P in which the pivot axis A–B is located includes therefor an angle ($\alpha/2$) with respect to the horizontal plane containing the cutting edge of the stationary blade $2a$.

The means for pivoting the member 3 and the movable blade 4 connected thereto about the pivot axis A–B are not shown in the drawing since these means do not form part of the present invention and any well known means may be used for pivoting the member 3 and the movable blade 4 carried thereby about the pivot axis.

The member 3 which has a front plate 3' carrying the movable blade at the region of the bottom edge of the front plate may be mounted on a stationary support for rocking movement about a fixed axis, arranged in the manner as described before, or the rear ends of the arms of the U-shaped member 3 may be mounted for pivoting movement about the axis A–B, arranged in the manner as described before, on arms of clamping means as described in the copending application by the same applicant entitle "Rocking Action Shearing Apparatus with Clamping Means" and filed Jan. 30, 1975, Ser. No. 545,592.

It will be understood that each of the elements described above, or two or more together, may also find a useful application in other types of shearing apparatus including a stationary blade and a movable rectilinear blade including a predetermined angle with the stationary blade differing from the type described above.

While the invention has been described and illustrated as embodied in a shearing apparatus which includes a stationary rectilinear blade mounted on a stationary support and a movable rectilinear blade including a predetermined angle with the stationary blade in which the movable blade is mounted for rocking movement about a pivot axis which is located in a plane bisecting the predetermined angle and which is substantially normal to a plane which includes the cutting edges of the two blades, it is not intended to be limited to the details shown since various modifications and structural changes may be made without departing in any way from the spirit of the present invention.

Without further analysis, the foregoing will so fully reveal the gist of the present invention that others can be applying current knowledge radily adapt it for various applications without omitting features, that from the standpoint of prior, fairly constitute essential characteristics of the generic or specific aspects of this invention.

I claim:

1. A rocking action shearing apparatus for shearing metal plates or the like, comprising stationary support means; a stationary blade having a rectilinear cutting edge and being fixedly mounted on said support means; a movable blade having a rectilinear cutting edge located substantially in one plane with the cutting edge of the fixed blade and being in this plane inclined at a predetermined angle with regard to the cutting edge of the stationary blade; and means mounting said movable blade for rocking movement about a pivot axis transversely spaced from the cutting edge of said movable blade and located in a plane bisecting said predetermined angle and substantially normal to said plane which includes the cutting edges of said blades.

2. A shearing apparatus as defined in claim 1, wherein said stationary blade is downwardly inclined from one to the other end thereof and wherein said movable blade is upwardly inclined from the corresponding end to the other end thereof, and wherein said pivot axis is located in a horizontal plane.

3. A shearing apparatus as defined in claim 2, and including a guide bar provided at the lower end of the fixed blade for positioning one edge of the plate to be sheared against said guide bar.

4. A shearing apparatus as defined in claim 1, wherein said mounting means comprises a U-shaped member having a front plate having a bottom edge and a pair of arms projecting rearwardly from opposite ends of said front plate, said movable blade being attached to said front plate in the region of the bottom edge thereof and including means in the region of the rear ends of said arms for mounting the member for rocking movement about said pivot axis.

5. A shearing apparatus as defined in claim 1, wherein said fixed blade extends in horizontal direction.

* * * * *